(12) United States Patent  
Hannu et al.

(10) Patent No.: US 11,910,318 B2
(45) Date of Patent: Feb. 20, 2024

(54) TRANSFER OF DATA BETWEEN NODES

(71) Applicant: Telefonaktiebolaget LM Ericsson (publ), Stockholm (SE)

(72) Inventors: Hans Hannu, Luleå (SE); Tommy Arngren, Södra Sunderbyn (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 17/265,225

(22) PCT Filed: Aug. 6, 2018

(86) PCT No.: PCT/EP2018/071283
§ 371 (c)(1),
(2) Date: Feb. 2, 2021

(87) PCT Pub. No.: WO2020/030244
PCT Pub. Date: Feb. 13, 2020

(65) Prior Publication Data
US 2021/0360527 A1 Nov. 18, 2021

(51) Int. Cl.
*H04W 52/02* (2009.01)
*H04L 67/62* (2022.01)

(52) U.S. Cl.
CPC ......... *H04W 52/0229* (2013.01); *H04L 67/62* (2022.05); *H04W 52/0216* (2013.01); *H04W 52/0277* (2013.01)

(58) Field of Classification Search
CPC ......... H04W 52/0229; H04W 52/0216; H04W 52/0277; H04L 67/62; Y02D 30/70
See application file for complete search history.

(56) References Cited

U.S. PATENT DOCUMENTS

| 2011/0070849 | A1 | 3/2011 | Venkatachalam et al. |
| 2014/0112232 | A1* | 4/2014 | Lu ........................... H04W 4/70 370/328 |
| 2015/0043402 | A1* | 2/2015 | Park ................. H04W 52/0229 370/311 |

* cited by examiner

*Primary Examiner* — Marcos L Torres
(74) *Attorney, Agent, or Firm* — Murphy, Bilak & Homiller, PLLC

(57) ABSTRACT

A first node (10) and a second node (12) are configured for the transfer of data between them. The second node (12) is configured to determine an extent to which the second node (12) will be available for a prospective transfer (16) of data (e.g., application data) to or from the second node (12). The second node (12) is configured to transmit to the first node (10) control signaling (20) (e.g., application-layer control signaling (20)) that indicates the determined extent. The first node (10) is configured to determine, based on the control signaling (20), whether and/or when to proceed with the prospective transfer (16) of data.

12 Claims, 14 Drawing Sheets

TRANSFER OF DATA BETWEEN NODES

TECHNICAL FIELD

The present application relates generally to the transfer of data between nodes.

BACKGROUND

Data transfer between nodes, especially via a wireless communication network, proves susceptible to failure or inefficiency in practice. The failure or inefficiency of a data transfer may for instance be attributable to poor wireless channel conditions, processing resource overload, or the like. Failed or inefficient data transfers waste scarce resources, including radio resources used for wireless communication as well as processing and power resources at the nodes participating in the data transfer. This in turn may contribute to diminished performance and capacity for the network, and reduced battery lifetime for nodes that are wireless devices.

SUMMARY

According to some embodiments herein, a node signals an extent to which the node will be available for a prospective data transfer (e.g., when and/or for how long the node will be available). A recipient may exploit the signalling to determine whether or not to proceed with the transfer. For example, if the prospective data transfer will take longer than the node will be available, e.g., given the amount of data to be transferred, the recipient in some embodiments refrains from proceeding with the transfer. Some embodiments thereby reduce the risk that a data transfer will be initiated but interrupted before completion. This may in turn advantageously conserve resources (e.g., radio resources, processing resources, power) and improve network performance/capacity as well as battery lifetime. Moreover, at least in embodiments where node availability is signalled using application-layer control signalling (e.g., in an HTTP header), some embodiments flexibly extend to a wide variety of services.

More particularly, embodiments herein include a method performed by a first node for transfer of application data between the first node and a second node (e.g., via a wireless communication network). The method may include receiving from the second node application-layer control signaling that indicates an extent to which the second node will be available for a prospective transfer of application data to or from the second node. The method may also include determining, based on the application-layer control signaling, whether and/or when to proceed with the prospective transfer of application data.

In some embodiments, this determination comprises determining whether or when to proceed with the prospective transfer based on comparing the extent to which the application-layer control signaling indicates the second node will be available and an extent to which the second node will need to be available in order for the prospective transfer to succeed.

Alternatively or additionally, the determination may comprise determining whether or not to proceed with the prospective transfer depending respectively on whether or not the extent to which the application-layer control signaling indicates the second node will be available is greater than or equal to an extent to which the second node will need to be available in order for the prospective transfer to succeed.

In some embodiments, the method may further comprise, responsive to determining not to proceed with the prospective transfer: refraining from transmitting a request to the second node for the prospective transfer; transmitting a response that rejects a request received from the first node for the prospective transfer; or cancelling the prospective transfer.

In some embodiments, the determination may comprise determining, based on the application-layer control signaling, to proceed with the prospective transfer but to delay the prospective transfer until the second node will be available to an extent needed for the prospective transfer to succeed.

Embodiments herein also include a method performed by a second node for transfer of application data between a first node and a second node (e.g. via a wireless communication network). The method may comprise determining an extent to which to indicate the second node will be available for a prospective transfer of application data to or from the second node. The method may also comprise transmitting to the first node application-layer control signaling that indicates the determined extent.

In some embodiments, this determination comprises determining the extent as a function of at least one of: an extent to which the second node has been available in the past for transfer of application data; a time of day; ongoing, scheduled, predicted, or learned activity at the second node; a current and/or predicted location of the second node; or a remaining battery life of the second node.

Alternatively or additionally, the determination may comprise determining the extent as a function of an estimated extent to which the first node will be available for the prospective transfer.

In any of these embodiments, the application-layer control signaling may indicate when the second node will be available for the prospective transfer.

Alternatively or additionally, the extent to which the second node will be available for the prospective transfer includes at least one of: for how long the second node will be available for the prospective transfer; for how much of a defined time interval the second node will be available for the prospective transfer; or an amount of application data that the second node will be available to transmit or receive in the prospective transfer.

In some embodiments, the application-layer control signaling indicates an extent to which the second node will be available for the prospective transfer of application data related to one or more specific applications or services and/or over one or more specific types of connections.

In some embodiments, the application-layer control signaling also indicates an estimated throughput for the prospective transfer.

In some embodiments, the application-layer control signaling comprises one or more fields in a header of a hypertext transfer protocol, HTTP, message.

Embodiments herein also include corresponding apparatus, computer programs, and carriers. For example, embodiments herein include a first node configured for transfer of application data between the first node and a second node (e.g., via a wireless communication network). The first node is configured (e.g., via processing circuitry) to receive from the second node application-layer control signaling that indicates an extent to which the second node will be available for a prospective transfer of application data to or from the second node, and to determine, based on the application-layer control signaling, whether and/or when to proceed with the prospective transfer of application data.

Embodiments also include a second node configured for transfer of application data between a first node and the second node (e.g., via a wireless communication network). The second node is configured (e.g., via processing circuitry) to determine an extent to which the second node will be available for a prospective transfer of application data to or from the second node, and to transmit to the first node application-layer control signaling that indicates the determined extent.

DETAILED DESCRIPTION

Figure 1:
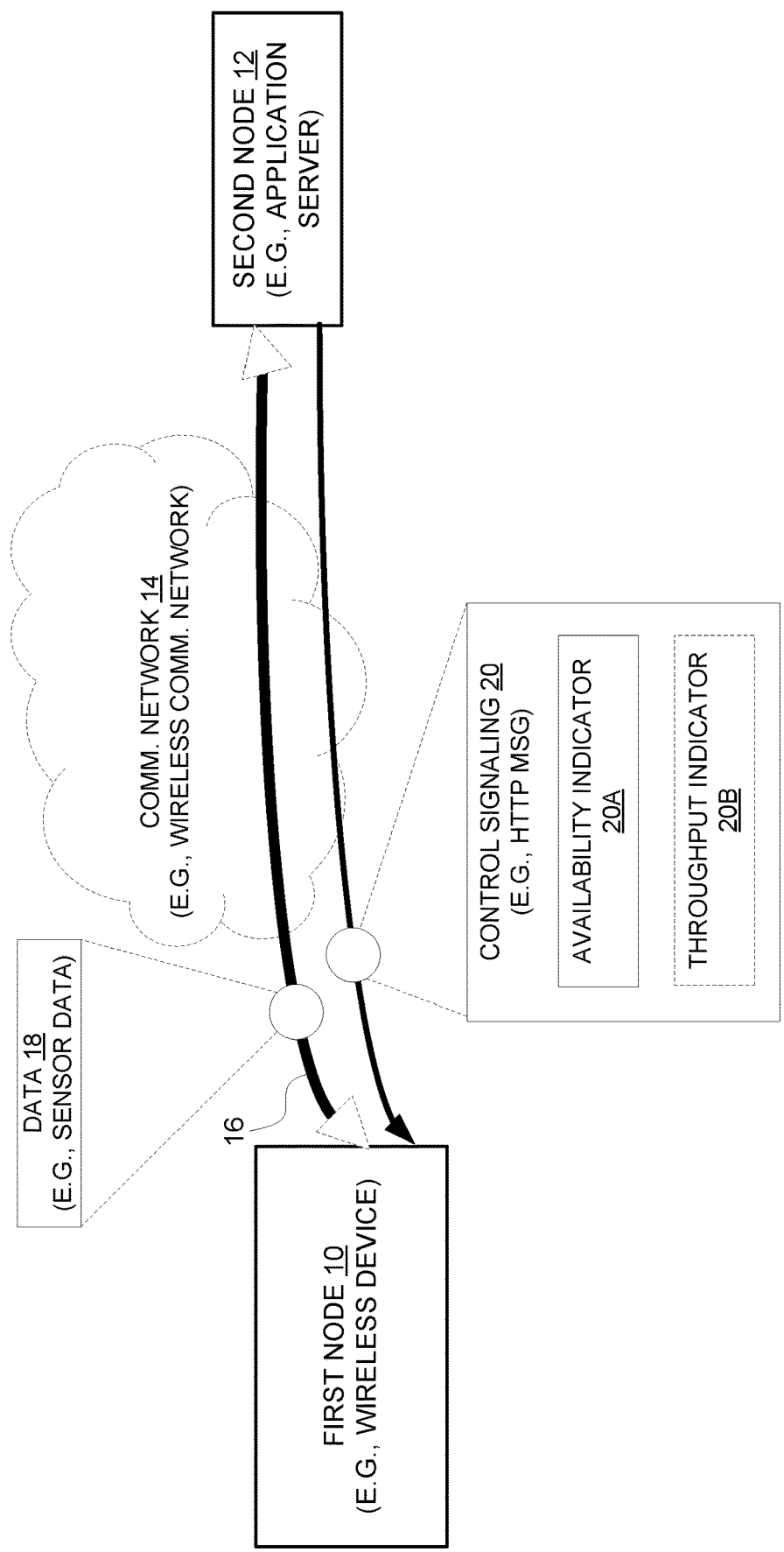
FIG. 1 is a block diagram of first and second nodes that are potential participants in a prospective data transfer according to some embodiments.

FIG. 1 shows a first node 10 and a second node 12 that are configured to communicate with one another. One or both of the first node 10 and the second node 12 may for instance be a communication device. In some embodiments, for example, the first node 10 and the second node 12 are configured to communicate via a communication network 14, such as a wireless communication network. In these and other embodiments, for example, the first node 10 may be a wireless device and the second node 12 may be an application server. Alternatively, although not shown, the second node 12 may be included in or be a part of the communication network 14, e.g., the second node 12 may be a radio network node or a core network node in a wireless communication network. In other embodiments, the first node 10 and the second node 12 are configured to communicate directly, e.g., via device-to-device communication. In these and other embodiments, both the first and the second nodes 10, 12 may be communication devices, such as e.g., wireless devices.

Regardless, the second node 12 contemplates the prospect of a transfer 16 of data 18 (e.g., sensor data or other application data) to or from the second node 12 (e.g., with the second node 12 being the source or the destination of the transfer 16). The prospective transfer 16 of data 18 in this regard may be prospective in the sense that the transfer 16 has been proposed, solicited, or scheduled to occur in the future between the nodes 10, 12 as identified participants in the transfer 16. Alternatively, the prospective transfer 16 of data 18 may be prospective merely in the sense that the second node 12 anticipates the possibility that the transfer 16 might occur in the future, no matter whether the first node 10 has been specifically identified as the other participant in the transfer 16.

Having contemplated this prospective transfer 16 of data 18, the second node 12 transmits to the first node 10 control signalling 20 related to the prospective transfer 16. The second node 12 may transmit this control signalling 20 to the first node 10 as part of specifically targeting the first node 10 as a recipient of the control signalling 20. For example, the second node 12 may transmit the control signalling 20 within or in association with a request to the first node 10 that requests the first node's participation in the prospective transfer 16. As another example, the second node 12 may transmit the control signalling 20 to the first node 10 in response to the first node 10 querying the second node 12 for such signalling 20. Alternatively, the second node 12 may transmit the control signalling 20 the first node 20 as part of generally (e.g., via multicast or broadcast) transmitting the control signalling 20 to any node that might engage the second node 12 in the prospective transfer 16. For example, the second node 12 may transmit the control signalling 20 within or in association with discovery signalling that advertises the second node's discoverability.

In any event, the control signalling 20 according to some embodiments notably indicates the extent to which the second node 12 will be available for the prospective transfer 16. The control signalling 20 may for instance indicate this extent in terms of when the second node 12 will be available for the prospective transfer 16 (e.g., now, 15 minutes from now, now until 1:00, from 1:00 to 2:00, etc.). Alternatively or additionally, the control signalling 20 may indicate the extent of the second node's availability in terms of for how long the second node 12 will be available for the prospective transfer 18 (e.g., 100 seconds, the next 50 seconds, etc.). The duration of the second node's availability may be defined as starting from a time at which the control signalling 20 is transmitted or received, starting from whatever time the prospective transfer 16 starts, starting at a time specified by the control signalling 20, or the like. The duration of the second node's availability may also be referred to as the second node's "uptime". In yet other embodiments, the control signalling 20 indicates the extent of the second node's availability in terms of for how much of a defined time interval the second node 12 will be available for the prospective transfer 16 (e.g., 5 minutes out of the next 15 minutes, which may for instance describe the extent of availability in spotty wireless coverage). In still other embodiments, the control signalling 20 indicates the extent of the second node's availability in terms of an amount of data 18 that the second node 12 will be available to transmit or receive in the prospective transfer 16 (e.g., 10 MB). The control signalling 20 as shown in FIG. 1 may include an availability indicator 20A that indicates this extent of the second node's availability in these or other terms.

The first node 10 in some embodiments exploits the control signalling 20 (e.g., the availability indicator 20A included in the control signalling 20) to determine whether to proceed with the prospective transfer 16. For example, if the control signalling 20 indicates the second node 12 will not be available to the extent needed for the prospective transfer 16 to succeed, the first node 10 may decide not to proceed with the prospective transfer 16. This may be the case for instance if the control signalling 20 indicates the second node 12 will not be available at the times that, or for as long as, the second node 12 would need to be available in order for the prospective transfer 16 to succeed (e.g., the transfer will take 60 minutes but the second node 12 will only be available for the next 10 minutes). Or, this may be the case if the control signalling 20 indicates the second node 12 will not be available to transmit or receive as much data as needed in order for the prospective transfer to succeed (e.g., the amount of data 18 to be transferred is 100 MB but the second node 12 is only available to transfer 10 MB).

As these examples illustrate, then, the first node 10 in some embodiments compares the extent to which the control signalling 20 indicates the second node 12 will be available to an extent to which the second node 12 will need to be available in order for the prospective transfer 16 to succeed. The first node 10 in this regard may proceed with the transfer 16 only if the second node 12 will be available to an extent that is greater than or equal to the extent needed for the transfer 16 to succeed.

In some embodiments, the first node's decision not to proceed with the prospective transfer 16 means that the first node 10 does not request or otherwise initiate the transfer 16. In other embodiments, the first node's decision not to proceed with the prospective transfer 16 means that the first node 10 rejects a request from the second node 12 for the transfer 16. In still other embodiments where the prospective transfer has been scheduled to occur in the future, the first node's decision may mean that the first node 10 cancels the transfer 16. In these and other embodiments, then, the first node's decision not to proceed with the prospective transfer 16 means that the transfer 16 never begins, e.g., based on an evaluation that the transfer 16 would not ultimately be able to succeed due to insufficient availability of the second node 12. Moreover, in one or more embodiments, no control signalling dedicated to setting up resources for the transfer 16 occurs.

Note that, in some embodiments, the control signalling 20 indicates the second node 12 is not available now for the prospective transfer 16 but indicates that the second node 12 will be available later (e.g., the signalling indicates the second node 20 will be available 15 minutes from now). In these and other embodiments, the first node 10 may determine to not proceed with the prospective transfer 16 now, but to proceed with the prospective transfer 16 later, e.g., to delay the transfer 16 until the second node 12 will be available. That is, the first node 12 exploits the control signalling 20 for scheduling of the prospective transfer 16.

The first node 12 may therefore generally determine whether and/or when to proceed with the prospective transfer 16, based on the control signalling 20. In this way, the control signalling 20 and the first node's exploitation of that control signalling 20 reduce the risk that the transfer 26 will be initiated but be interrupted or fail before completion. This may in turn advantageously conserve resources (e.g., radio resources, processing resources, power) and improve network performance or capacity as well as battery lifetime if applicable to the first and/or second node 10, 12.

Note that the control signalling 20 may be transmitted at any protocol layer supported by the first and second nodes 10, 12. The control signalling 20 may for instance constitute radio resource control (RRC) signalling, e.g., such that the availability indicator 20A may be an RRC information element (IE). In other embodiments, the control signalling 20 may be transmitted as QUIC signalling. In still other embodiments, the control signalling 20 may be application-layer control signalling. The application-layer control signaling may for instance take the form of hypertext transfer protocol (HTTP) signaling, session initiation protocol (SIP) signaling, or session description protocol (SDP) signaling.

Where the application-layer control signalling is HTTP signalling, the signalling 20 may more specifically constitute one or more fields of a header of an HTTP message (Msg). The HTTP message may be an HTTP REQUEST message or an HTTP RESPONSE message. The one or more fields may include an answer field in the header of the HTTP message and may for example be named "node-availability-estimate" for indicating a node's expected availability (e.g, uptime) for a prospective transfer. A corresponding query field may also be defined, e.g., for indicating accepted encoding variants for the estimated availability (e.g., seconds, bytes, interval, fraction of an interval, etc.).

Especially where the control signaling 20 constitutes application-layer control signaling (e.g., HTTP signaling), some embodiments flexibly extend to a wide variety of services, e.g., in a standardized, non-proprietary manner that eases deployment and use of the control signalling 20. This may be attributable in part due to the text-based nature of and extendibility of application-layer control signalling. This may alternatively or additionally be attributable to extensions of application-layer control signalling having no effect on intermediate nodes via which the transfer 16 is made.

Regardless of the layer at which the control signalling 20 is transmitted, in some embodiments, the control signalling 20 indicates the extent of the second node's availability for the prospective transfer 16 without qualification, e.g., without specifying conditions or circumstances for that availability. For example, in some embodiments, the control signalling 20 indicates the extent of the second node's availability without regard to the type of the transfer 16, the type of data 18 to be transferred, or the type of connection (e.g., WiFi) over which the second node 12 is available. In such a case, the control signalling 20 may generically apply to any transfer, e.g., so as to indicate the second node's general availability. The first node 10 may therefore flexibly exploit the control signalling 20 for proceeding with any transfer to or from the second node 12.

In other embodiments, by contrast, the control signalling 20 indicates the second node's availability in a qualified manner, e.g., as being applicable under specific conditions or circumstances. For example, the control signalling 20 may indicate the extent of the second node's availability for one or more specific types of transfers and/or for the transfer of one or more specific types of data (e.g., data related to one or more specific applications or services). In such a case, the second node 12 may generate the control signalling 20 to indicate its availability for a data transfer to an extent that is commiserate with a priority, urgency, or importance of the type of that transfer or the type of the data 20 to be transferred. This may therefore enable the second node 12 to effectively reserve availability for or prioritize certain types of transfers or data. In some embodiments, the control signalling 20 may even indicate certain types of transfers or data in a prioritized order so as to indicate the second node's prioritization to the first node 10.

As another example, the control signalling 20 may indicate the extent of the second node's availability for a prospective transfer 16 over one or more specific types of connections (e.g., Wi-Fi or another type of access connection via which the second node 12 accesses the communication network 14). In such a case, the second node 12 may generate the control signalling 20 to indicate its availability for a data transfer to an extent that is commiserate with a preference for certain type(s) of connections (e.g., Wi-Fi). This may therefore enable the second node 12 to effectively reserve availability for or prioritize certain types of connections. In some embodiments, the control signalling 20 may even indicate certain types of connections in a prioritized order so as to indicate the second node's prioritization to the first node 10. Additionally or alternatively, the control signalling 20 may enable the first node 10 to decide whether and/or when to proceed with the prospective transfer 16 based on a type of connection via which the transfer 16 will be made. The first node 10 may for instance preferentially proceed with transfers in which the second node 12 has a Wi-Fi connection, which may for instance ultimately offer greater throughput and/or power efficiency for the first node 10.

Additionally or alternatively to the control signalling 20 indicating the extent of the second node's availability over one or more specific types of connections, the control signalling 20 in some embodiments also includes a throughput indicator 20B as shown in FIG. 1. The throughput indicator 20B may indicate an estimated (average) throughput of the prospective transfer 16 (e.g., 1,000,000 bits per second). The first node 10 in some embodiments exploits the throughput indicator 20B to decide whether and/or when to proceed with the prospective transfer 16 based not only on the second node's availability but also on the estimated throughput of the transfer 16. The first node 10 may for instance preferentially proceed with transfers in which the estimated throughput at least meets a defined throughput threshold. In other embodiments, the first node 10 may use the throughput indicator 20B to estimate how much time the prospective transfer 16 would take, in order to determine whether the second node 12 will be available for long enough to complete the transfer 16.

With or without qualifications to the indicated extent of the second node's availability, the second node 12 may determine that extent in any number of ways, e.g., based on any parameters, criteria, or conditions that are indicative of or correlated with the second node's availability. In some embodiments, the second node 12 determines the extent of its availability for the prospective transfer 16 based on the second node's statistical, typical, or historical availability, e.g., for similar transfers. For example, the second node 12 may determine the extent of its availability for the prospective transfer 16 as a function of an extent to which the second node 12 has been available in the past for data transfer. To indicate for how long the second node 12 will be available for the prospective transfer 16, for instance, the second node 12 may calculate the duration of its availability as the average duration of the second node's previous N transfer sessions or the average duration of the second node's previous N transfer sessions where its signal strength or quality was above a defined threshold.

Alternatively or additionally, the second node 12 may determine the extent of its availability for the prospective transfer 16 as a function of a time of day. The second node 12 may for instance indicate it is available to a lesser extent during times of the day that the second node 12 typically become unavailable. Where the second node 12 is a wireless device, for example, such times of the day may be associated with the second node 12 typically losing network connection or acceptable connection quality, powering down, or being loaded with other tasks. Or, in another scenario, the second node 12 may indicate it is available to a greater extent during a time of the day that the second node 12 expects to be less loaded (e.g., in the middle of the night).

In other embodiments, the second node 12 may additionally or alternatively determine the extent of its availability for the prospective transfer 16 as a function of ongoing, scheduled, predicted, or learned activity at the second node 12. Where the second node 12 is a wireless device or other user equipment, such activity may include for instance a travel schedule associated with the second node's user, calendar entries or bookings in a calendar of the second node's user, ongoing voice/video call sessions, a currently used application, or any behavior learned from user activity. The second node 12 may for instance indicate it is available for the prospective transfer 16 to a lesser extent when the second node's user is scheduled to board a train or plane, when the second node's user typically enters a building, or when the second node 12 has an ongoing call session.

In still other embodiments, the second node 12 may determine the extent of its availability for the prospective transfer 16 as a function of a current and/or predicted location of the second node 12. Where the second node 12 is a wireless device, for example, such location may be reflective or otherwise indicative of expected signal quality that affects the second node's availability. In this case, then, the second node 12 may indicate it is available to a lesser extent when the second node 12 is or is predicted to be at a certain location, e.g., with historically poor signal quality.

In yet other embodiments, the second node 12 may determine the extent of its availability for the prospective transfer 16 as a function of a remaining battery life of the second node 12. If for instance the second node's battery life falls below a defined threshold, the second node 12 may indicate it is available to a lesser extent than when the second node's battery life was above the threshold. The threshold may be fixed or may be dynamically adjusted depending on other processing at the second node 12 that may affect battery drain. Alternatively or additionally, the threshold may be adapted to reflect the amount of time that the second node 12 has historically remained available at different battery levels.

Note though that the second node 12 may exploit the control signaling 20 herein to indicate its availability for the transfer 16 to an extent that may differ from the actual extent to which the second node 12 will be available. For example, the control signaling 20 may indicate the extent to which the second node 12 will make itself available for the prospective transfer 16, which may be less than the extent to which the second node 12 could be available if so desired. As another example, the control signaling 20 may indicate its availability for the transfer 16 to an extent that the second node 12 chooses in order to steer or influence the behavior of the first node 10. The second node 12 may for instance indicate it will be available for the transfer 16 to a lesser extent than it will actually be available, in order to steer the first node 10 towards not proceeding with the transfer 16. The second node 12 may do so in one example where the second node 12 has better insight into the first node's availability than the first node itself, e.g., the second node 12 knows that the first node 10 is not in a good location or availability state to begin the transfer. Generally, then, the second node 12 in some embodiments determines the extent to which to indicate it will be available for the prospective transfer 16 as a function of an estimated extent to which the first node 10 will be available for the transfer 16.

Consider now an example use case for some embodiments herein. In this example use case, the first node 10 may be a wireless device and the second node 12 may be an application server to which the wireless device is to upload data (e.g., data from a sensor or camera of the wireless device). The wireless device may query the application server for information indicating when or for how long the application server will be available for the wireless device to upload data to it. In response to the query, the application server may estimate when or for how long the application server will be available for the prospective upload (e.g., as a function of the current or predicted load at the application server) and transmit control signaling 20 to the wireless device indicating the estimated availability. The wireless device may then determine whether or when to proceed with the upload based on the control signaling 20.

In another use case, the first node 10 may be an application server and the second node 12 may be a wireless device that the application server is to transmit data to (e.g., for pre-caching, for a requested download, etc.). The application server may query the wireless device for information indicating when or for how long the wireless device will be available for the transfer over a Wi-Fi connection. In response to the query, the wireless device may transmit control signaling 20 to the application server indicating the requested information. The application server may then determine whether or when to proceed with the transfer based on the control signaling 20.

In yet another use case, the first node 10 and the second node 12 may be peer nodes (e.g., of a peer-to-peer network). In this case, the first node 10 may query multiple other peer nodes, including the second node 12, for the extent to which the peer nodes will be available for the first node 10 to download certain content from the peer nodes. The queried peer nodes may respond with control signaling 20 indicating their respective availability. Based on this control signaling 20, the first node 10 may select which of the other peer nodes to download the certain content from. That is, the first node 10 may select the peer node to download certain content from based not only on which peer nodes have the certain content, but also based on the availability of those peer nodes.

Figure 2:
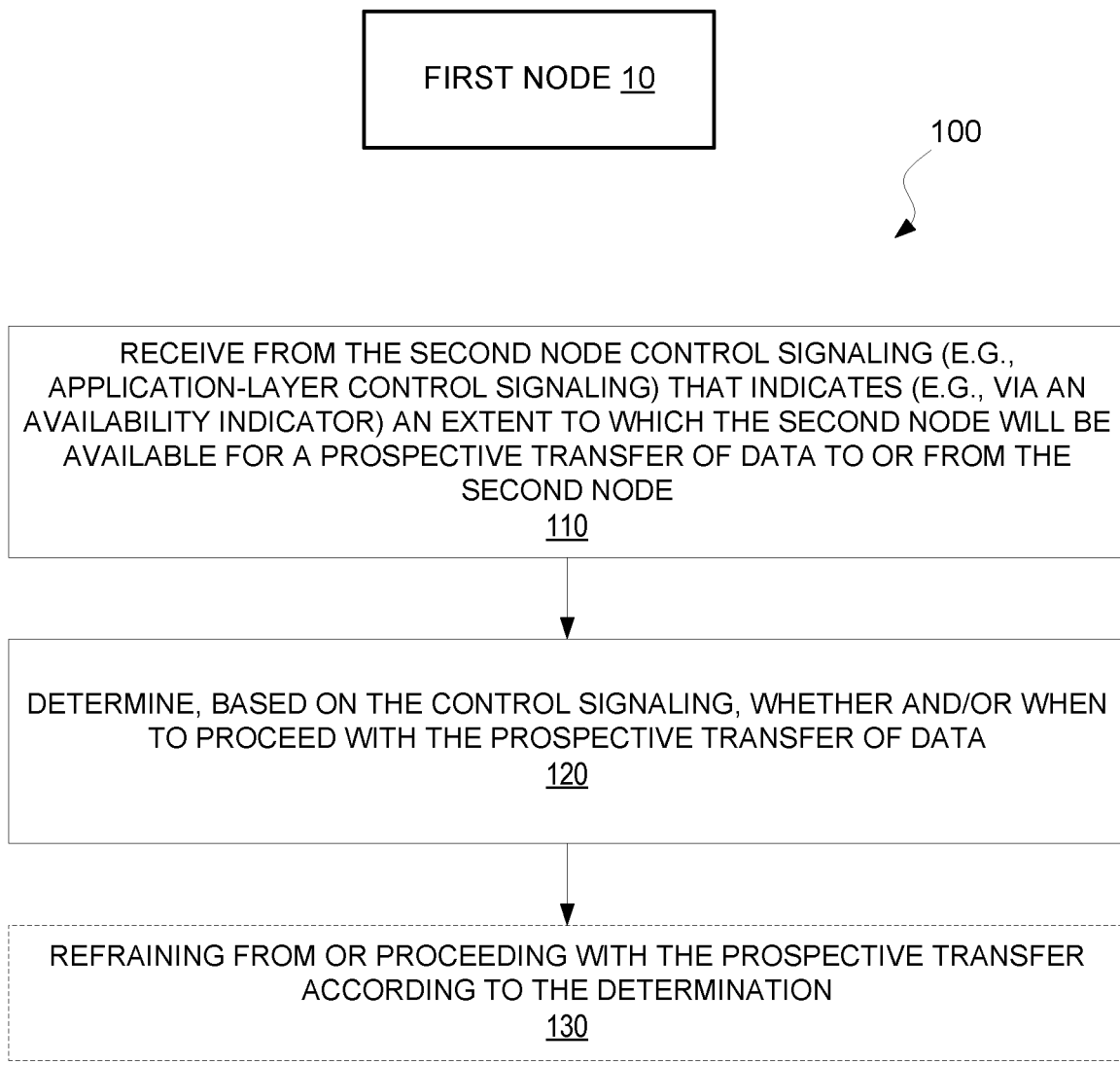
FIG. 2 is a logic flow diagram of a method performed by the first node according to some embodiments.

In view of the above modifications and variations, FIG. 2 shows a method 100 performed by the first node 10 for transfer of data between the first node 10 and the second node 12, e.g., via a (wireless) communication network 14. The method 100 as shown includes receiving from the second node 12 control signaling 20 (e.g., application-layer control signaling such as HTTP signaling) that indicates an extent to which the second node 12 will be available for a prospective transfer 16 of data (e.g., application data) to or from the second node 12 (Block 110). The control signaling 20 may for instance indicate when or for how long the second node 12 will be available for the prospective transfer 16. Alternatively or additionally, the control signaling 20 may indicate an amount of data that the second node 12 will be available to transmit or receive in the prospective transfer 16. Regardless, the method 100 may also include determining, based on the control signaling 20, whether and/or when to proceed with the prospective transfer 16 of data (Block 120).

In some embodiments, the method 100 also includes refraining from or proceeding with the prospective transfer 16 of data in accordance with the determination (Block 1300. For example, where the first node 10 determines to refrain from proceeding with the transfer 16, this may entail refraining from requesting the transfer 16, rejecting the transfer as requested, canceling the transfer or the like. Where the first node 10 determines to proceed with the transfer 16, by contrast, this determination may be a part of a decision to select which of multiple possible nodes to engage in a transfer.

Figure 3:
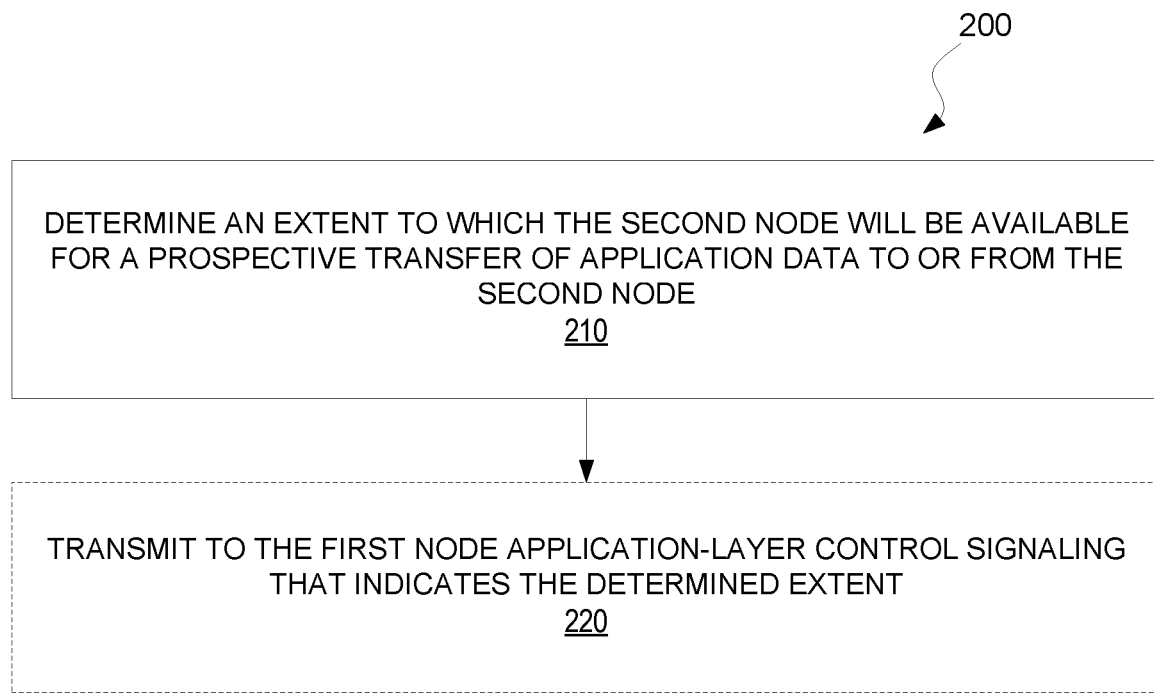
FIG. 3 is a logic flow diagram of a method performed by the second node according to some embodiments.

FIG. 3 illustrates a corresponding method 200 performed by the second node 12 for transfer of data between the first node 10 and the second node 12, e.g., via a (wireless) communication network 14. The method 200 as shown includes determining an extent to which to indicate the second node 12 will be available for a prospective transfer 16 of data (e.g., application data) to or from the second node 12 (Block 210). This may include for instance determining when or for how long to indicate the second node 12 will be available for the prospective transfer 16. Alternatively or additionally, this may include determining an amount of data to indicate that the second node 12 will be available to transmit or receive in the prospective transfer 16. Regardless, the method 200 may also include transmitting to the first node 10 control signaling 20 (e.g., application-layer control signaling such as HTTP signaling) that indicates the determined extent (Block 220).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4A:
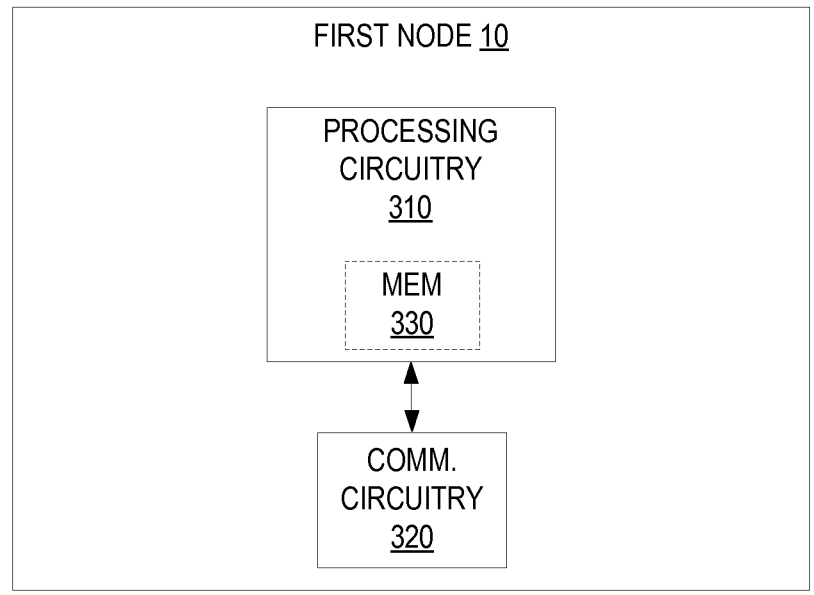
FIG. 4A is a block diagram of the first node according to some embodiments.

FIG. 4A for example illustrates the first node 10 as implemented in accordance with one or more embodiments. As shown, the first node 10 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the first node 10. The processing circuitry 310 is configured to perform processing described above, such as by executing instructions stored in memory 330. The processing circuitry 310 in this regard may implement certain functional means, units, or modules.

Figure 4B:
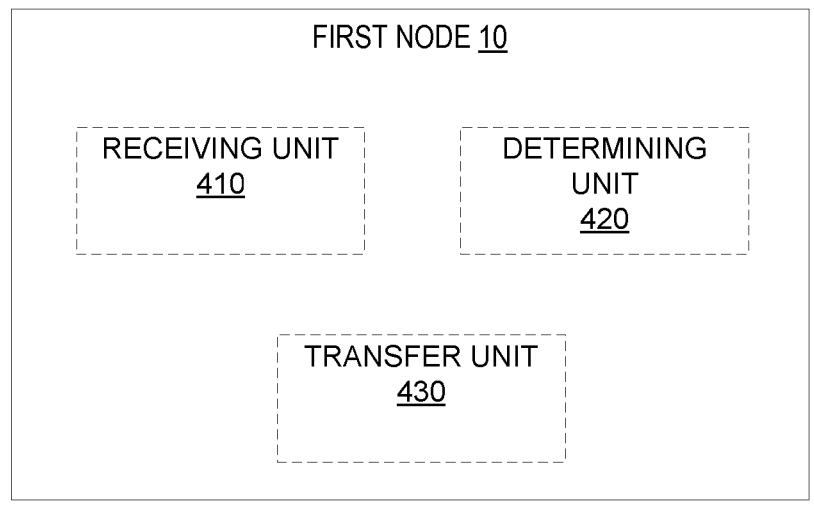
FIG. 4B is a block diagram of the first node according to other embodiments.

FIG. 4B illustrates a schematic block diagram of the first node 10 according to still other embodiments. As shown, the first node 10 implements various functional means, units, or modules, e.g., via the processing circuitry 310 in FIG. 4A and/or via software code. These functional means, units, or modules, e.g., for implementing the method 100 in FIG. 2 herein, include for instance a receiving unit 410 for receiving from the second node 12 control signaling 20 (e.g., application-layer control signaling such as HTTP signaling) that indicates an extent to which the second node 12 will be available for a prospective transfer 16 of data (e.g., application data) to or from the second node 12. Also included may be a determining unit 420 for determining, based on the control signaling 20, whether and/or when to proceed with the prospective transfer 16 of data. In some embodiments, the first node 10 also includes a transfer unit 430 for refraining from or proceeding with the prospective transfer 16 of data in accordance with the determination.

Figure 5A:
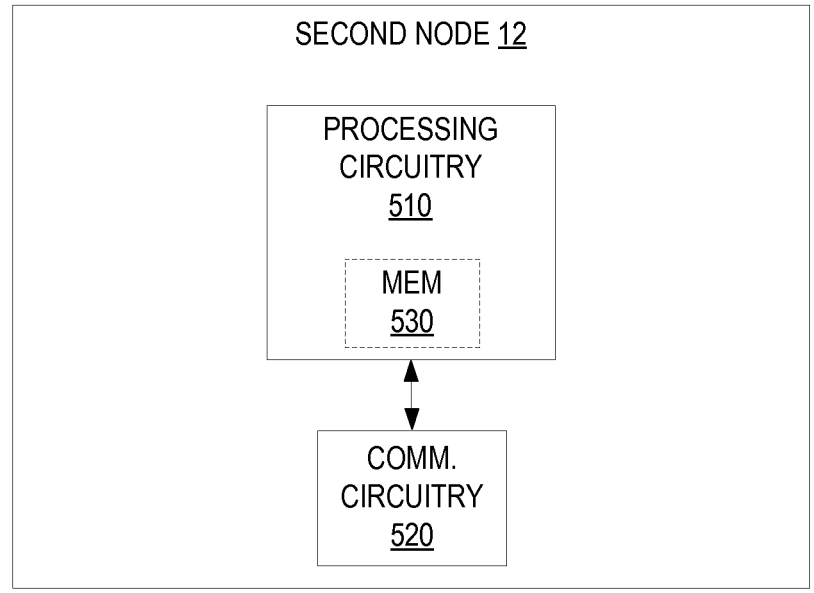
FIG. 5A is a block diagram of the second node according to some embodiments.

FIG. 5A illustrates the second node 12 as implemented in accordance with one or more embodiments. As shown, the second node 12 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, or modules.

Figure 5B:
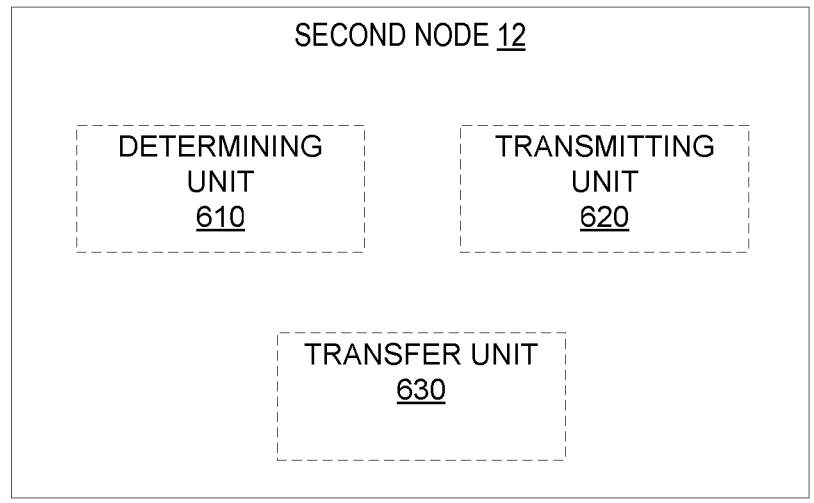
FIG. 5B is a block diagram of the second node according to other embodiments.

FIG. 5B illustrates a schematic block diagram of the second node 12 in according to still other embodiments. As shown, the second node 12 implements various functional means, units, or modules, e.g., via the processing circuitry 510 in FIG. 5A and/or via software code. These functional means, units, or modules, e.g., for implementing the method 200 in FIG. 3 herein, include for instance a determining unit 610 for determining an extent to which to indicate the second node 12 will be available for a prospective transfer 16 of data (e.g., application data) to or from the second node 12. Also included may be a transmitting unit 620 for transmitting to the first node 10 control signaling 20 (e.g., application-layer control signaling such as HTTP signaling) that indicates the determined extent. In some embodiments, the second node 12 further includes a transfer unit 630 for refraining from or proceeding with the prospective transfer 16 of data.

Those skilled in the art will also appreciate that embodiments herein further include corresponding computer programs.

A computer program comprises instructions which, when executed on at least one processor of the first node 10 or the second node 12, cause the first node 10 or the second node 12 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Note that the first node 10 and the second node 12 may each be any device, equipment, or other node that is configured for, capable of, or operable for data transfer with the other node. The first node 10 and/or the second node 12 may for instance be a device in the form of a communication device that may communicate via wireline or wireless technology. Consider embodiments described below in a context where the data transfer occurs via wireless technology. This may be because at least one of the first and second node is a communication device (e.g., in the form of a wireless device) that communicates via wireless technology. Or, this may be because the first and second nodes 10, 12 realize the data transfer via one or more intermediate nodes that communicate via wireless technology, e.g., even if the first and second nodes 10, 12 themselves communicate via wireline technology.

Figure 6:
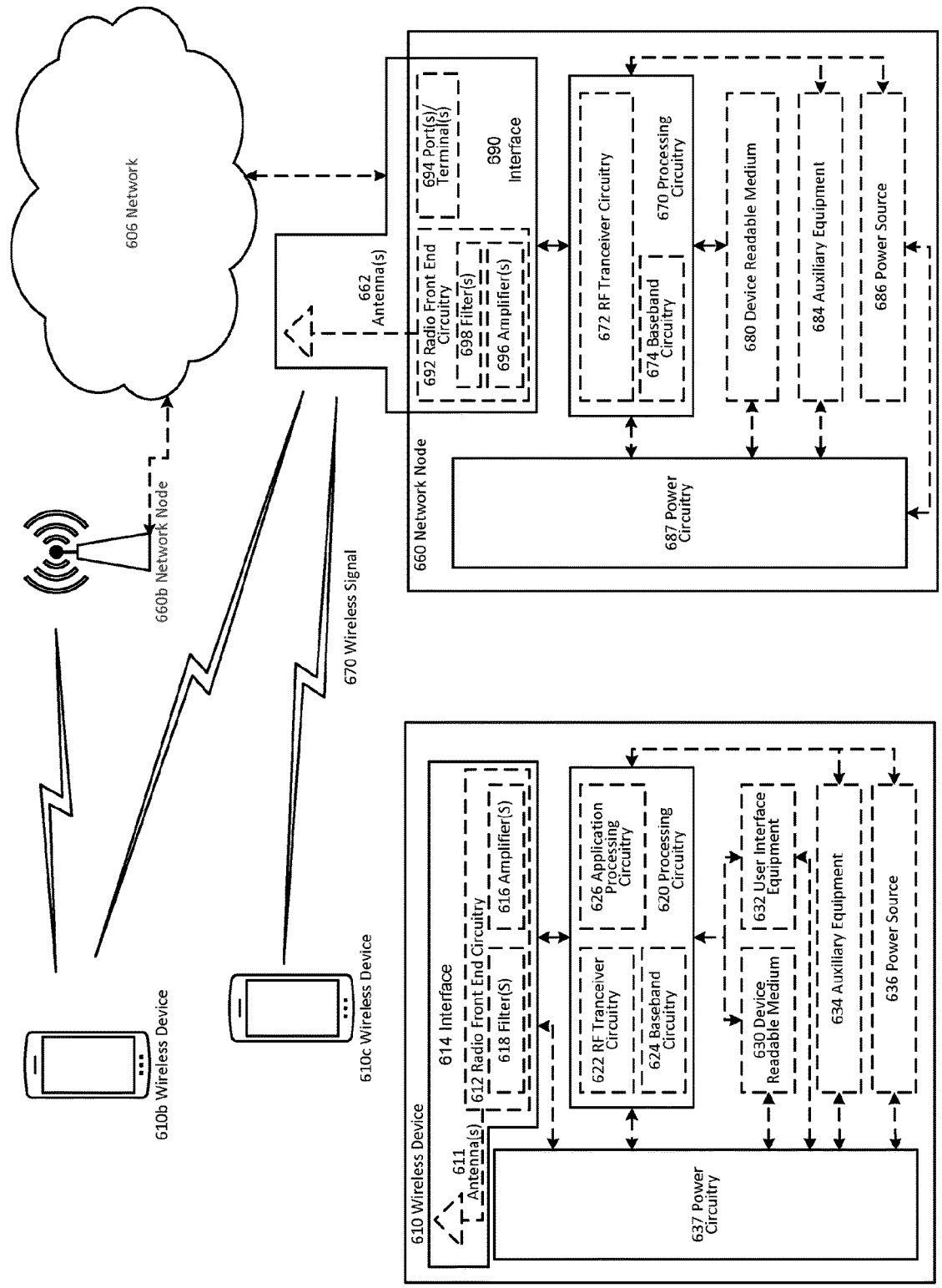
FIG. 6 is a block diagram of a wireless communication network according to some embodiments.

The embodiments disclosed herein are described below in relation to a wireless network, such as the example wireless network illustrated in FIG. 6. The wireless network of FIG. 6 depicts network 606, network nodes 660 and 660b, and wireless devices (WDs) 610, 610b, and 610c. In some embodiments, network node 600 or 660b corresponds to the first node 10 herein and wireless device 610, 610b, or 610c corresponds to the second node 12. In other embodiments, network node 600 or 660b corresponds to the second node 12 and wireless device 610, 610b, or 610c corresponds to the first node 10. In still other embodiments, one of wireless devices 610, 610b, or 610c corresponds to the first node 10 whereas a different one of wireless devices 610, 610b, or 610c corresponds to the second node 12. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a user equipment (UE), a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium functionality 630 or in memory within processing circuitry 620 to provide the disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
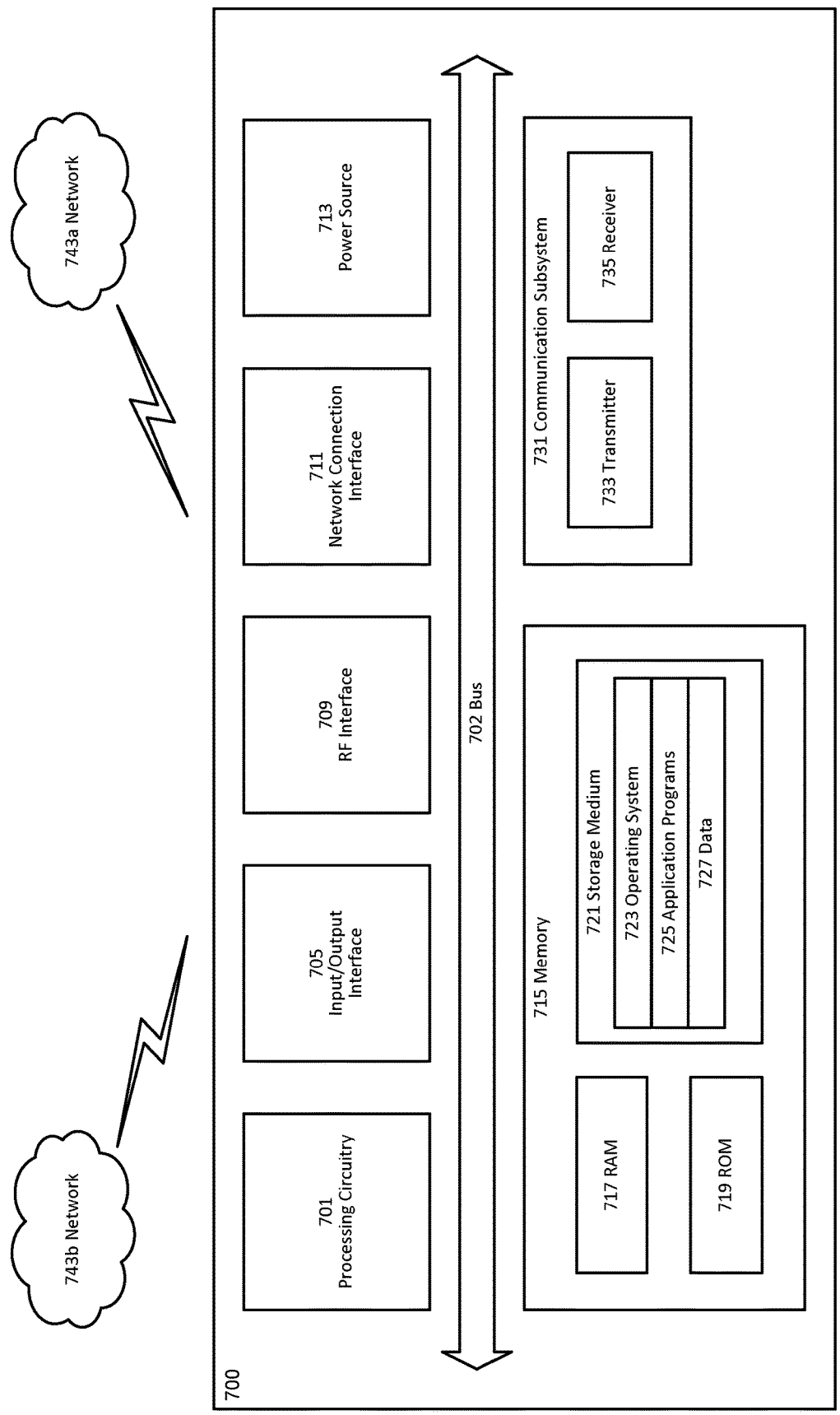
FIG. 7 is a block diagram of a user equipment according to some embodiments.

FIG. 7 illustrates one embodiment of a communication device 700 in accordance with various aspects described herein. The communication device 700 may not necessarily have a user in the sense of a human user who owns and/or operates the relevant device. Instead, the communication device 700 may represent a device that is intended for sale to, or operation by, a human user but which may not, or which may not initially, be associated with a specific human user (e.g., a smart sprinkler controller). Alternatively, the communication device 700 may represent a device that is not intended for sale to, or operation by, an end user but which may be associated with or operated for the benefit of a user (e.g., a smart power meter). The communication device 700 in FIG. 7 may be any user equipment (UE) identified by the 3$^{rd}$ Generation Partnership Project (3GPP), including a NB-IoT UE, a machine type communication (MTC) UE, and/or an enhanced MTC (eMTC) UE. The communication device 700, as illustrated in FIG. 7, may be one example of a WD configured for communication in accordance with one or more communication standards promulgated by the 3$^{rd}$ Generation Partnership Project (3GPP), such as 3GPP's GSM, UMTS, LTE, and/or 5G standards.

In FIG. 7, communication device 700 includes processing circuitry 701. The communication device 700 in some embodiments includes one or more of an input/output interface 705, radio frequency (RF) interface 709 (e.g., where the communication device 700 is a wireless device or user equipment), network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain communication devices may utilize all of the components shown in FIG. 7, or only a subset of the components. The level of integration between the components may vary from one communication device to another communication device. Further, certain communication devices may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. Communication device 700 may be configured to use an output device via input/output interface 705. An output device may use the same type of interface port as an input device. For example, a USB port may be used to provide input to and output from communication device 700. The output device may be a speaker, a sound card, a video card, a display, a monitor, a printer, an actuator, an emitter, a smartcard, another output device, or any combination thereof. Communication device 700 may be configured to use an input device via input/output interface 705 to allow a user to capture information into communication device 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by communication device 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow communication device 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of communication device 700.

The features, benefits and/or functions described herein may be implemented in one of the components of communication device 700 or partitioned across multiple components of communication device 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
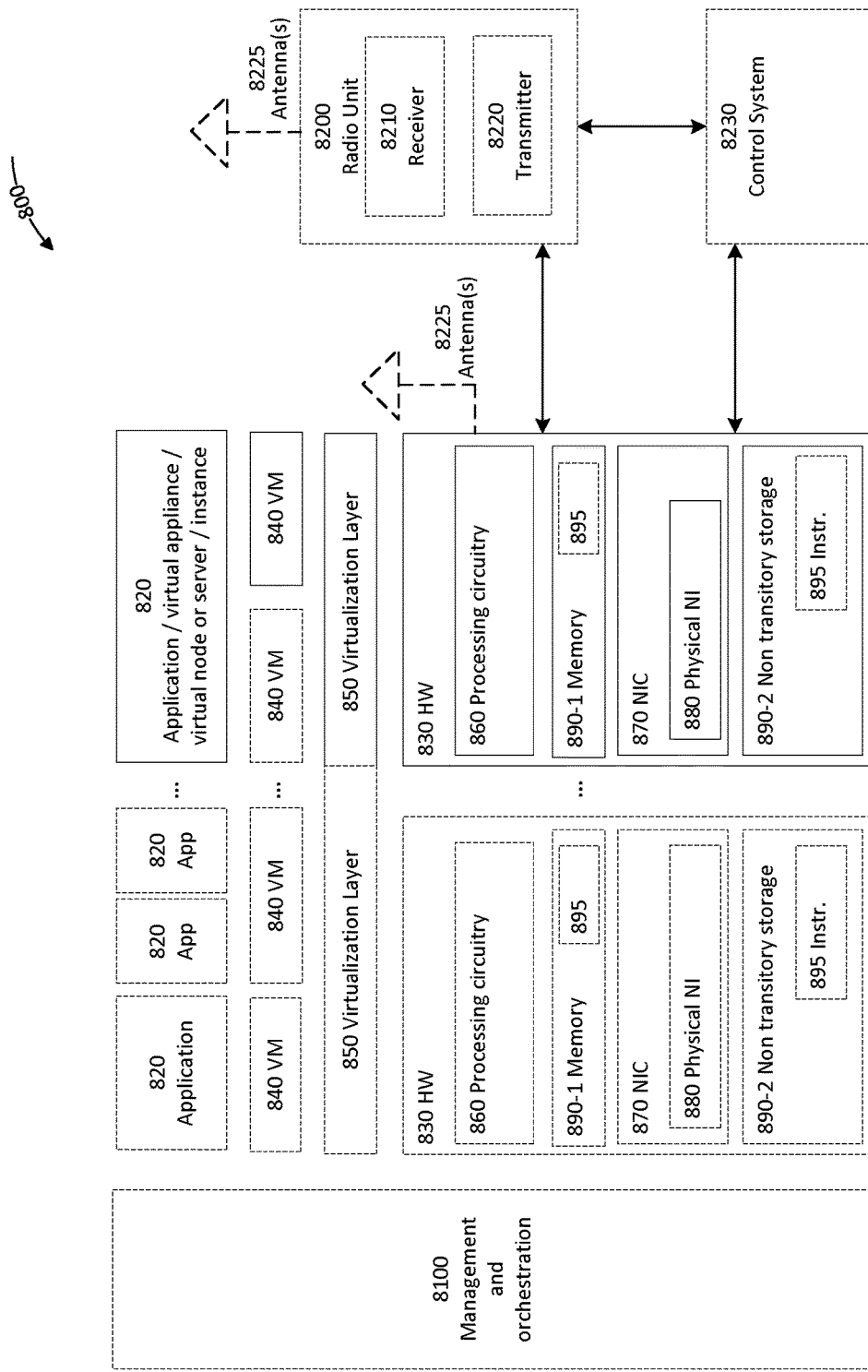
FIG. 8 is a block diagram of a virtualization environment according to some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. For example, in some embodiments, the first node 10 is implemented as virtual components executed by one or more virtual machines implemented in one or more virtual environments 800 hosted by one or more of hardware nodes 830. Alternatively or additionally, the second node 12 may be as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE))

where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
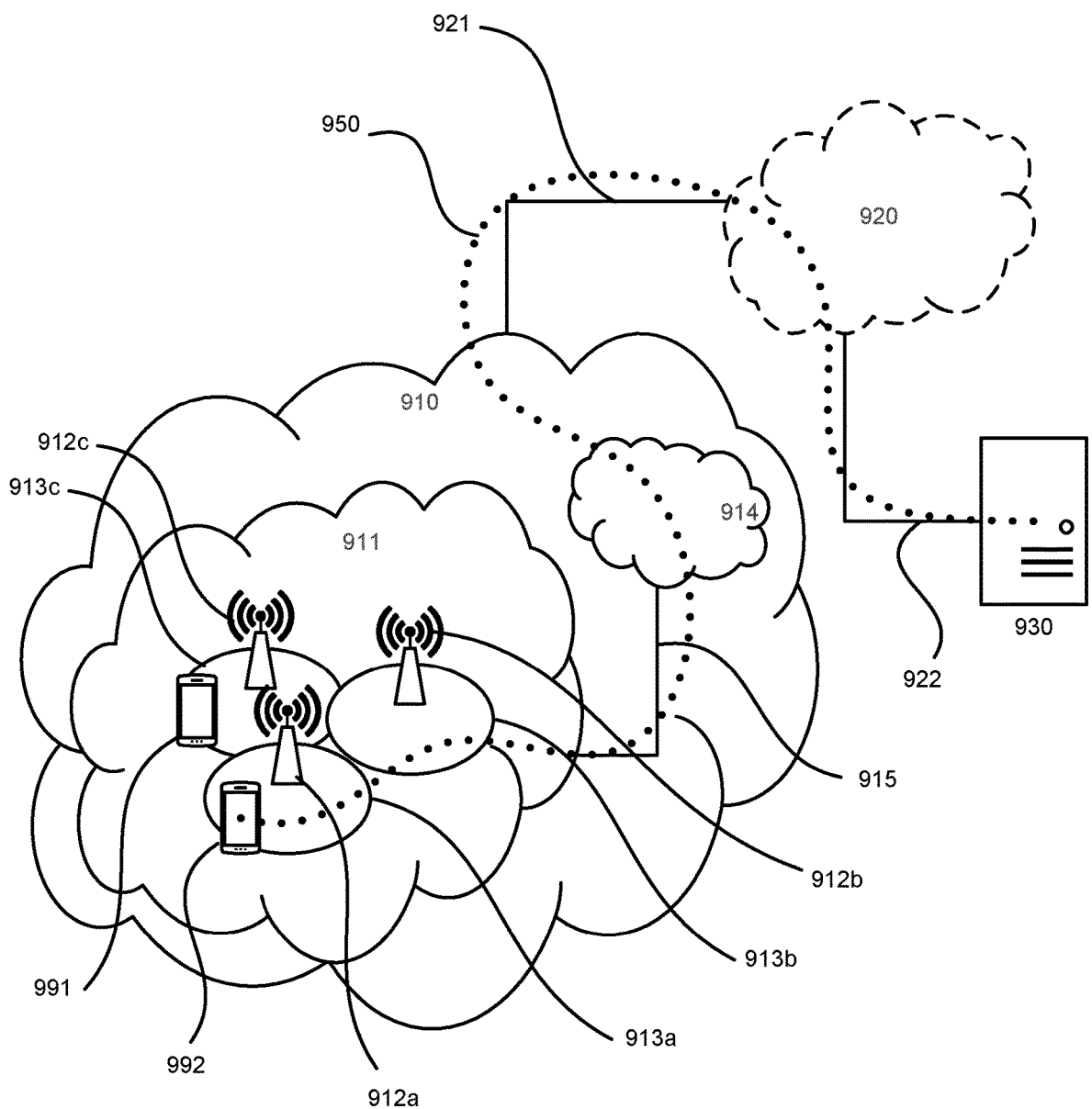
FIG. 9 is a block diagram of a communication network with a host computer according to some embodiments.

FIG. 9 illustrates a telecommunication network connected via an intermediate network to a host computer in accordance with some embodiments. In particular, with reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

In this context, the first node 10 and second node 12 in some embodiments may exploit the OTT connection 950 to realize the data transfer between them as described above. In one or more embodiments, for instance, the first node 10 may be or be implemented on the host computer 930 and the second node 12 may be one of the connected UEs 991, 992. In other embodiments, the second node 12 may be or be implemented on the host computer 930 and the first node 10 may be one of the connected UEs 991, 992

Figure 10:
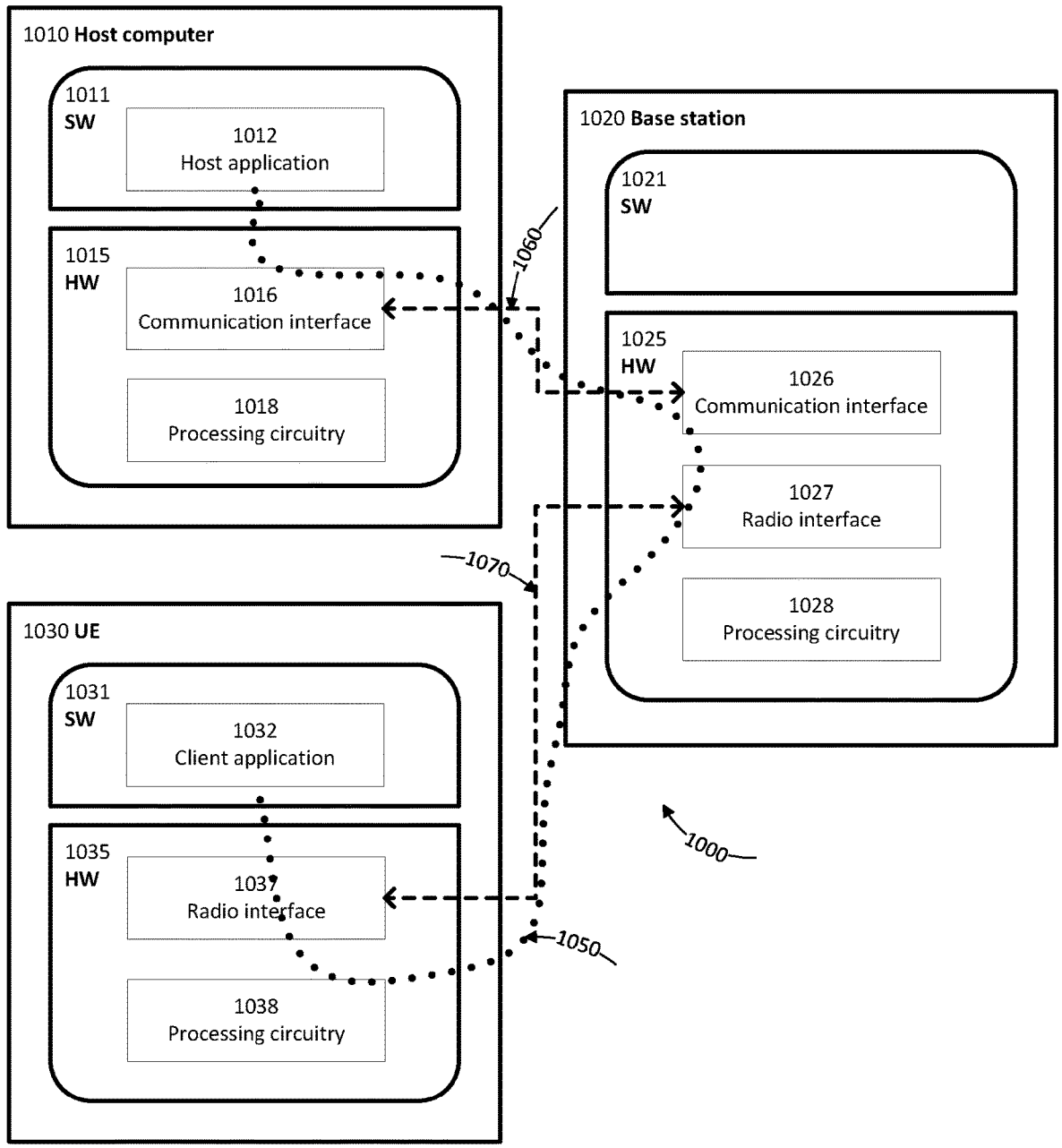
FIG. 10 is a block diagram of a host computer according to some embodiments.

Example implementations, in accordance with an embodiment, of the UE, base station and host computer discussed in the preceding paragraphs will now be described with reference to FIG. 10. FIG. 10 illustrates host computer communicating via a base station with a user equipment over a partially wireless connection in accordance with some embodiments In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

Again in this context, then, the first node 10 and second node 12 in some embodiments may exploit the OTT connection 1050 to realize the data transfer between them as described above. In one or more embodiments, for instance, the first node 10 may be or be implemented on the host computer 1010 and the second node 12 may be UE 1030. In other embodiments, the second node 12 may be or be implemented on the host computer 1010 and the first node 10 may be UE 1030

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the resource efficiency (e.g., radio resource efficiency, power efficiency, etc.) and thereby provide benefits such as relaxed restriction on file size, extended battery lifetime, and the like.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
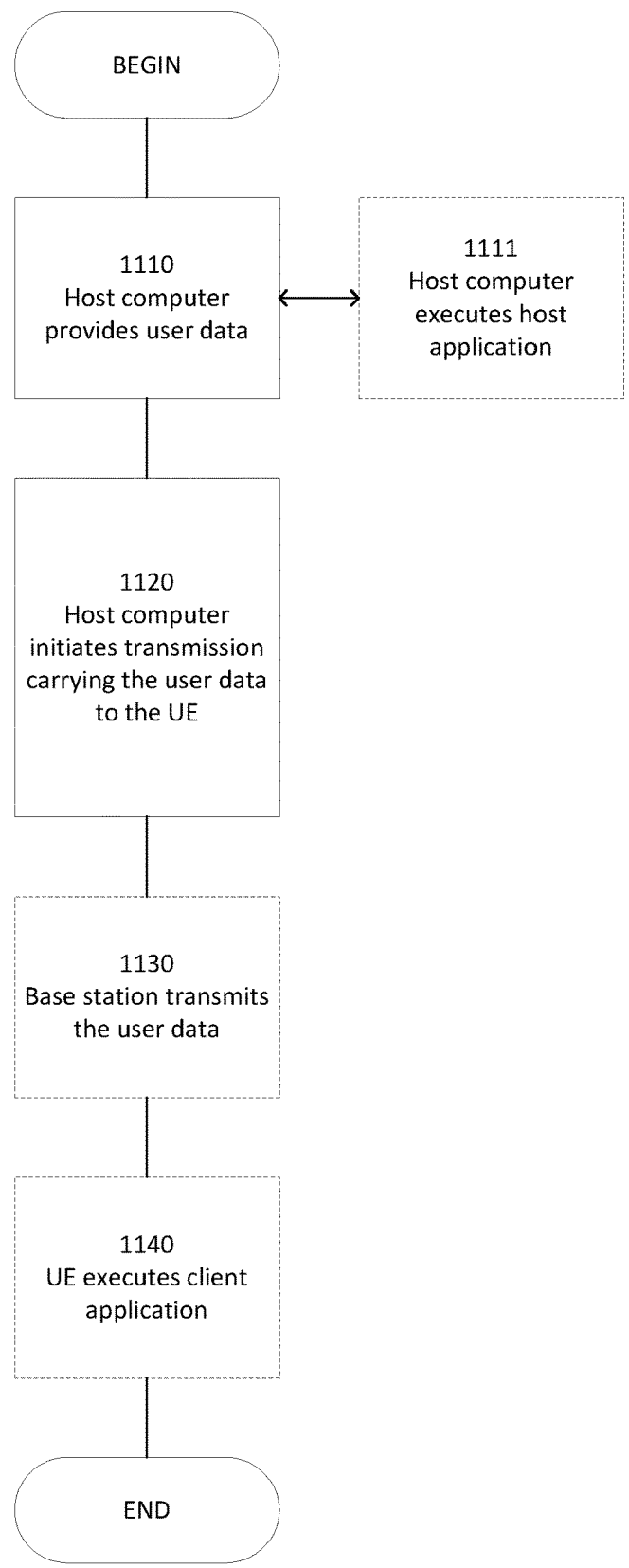
FIG. 11 is a flowchart illustrating a method implemented in a communication system, in accordance with one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
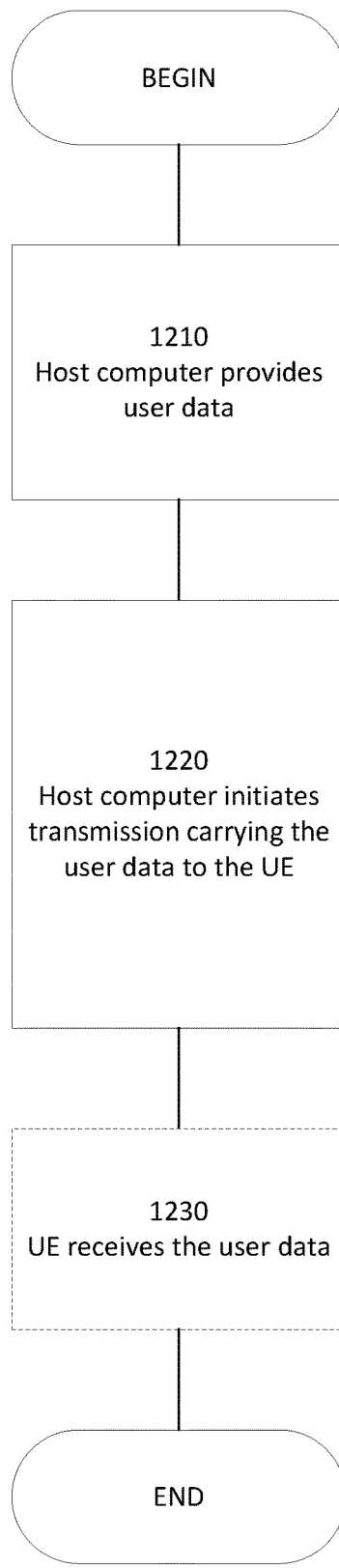
FIG. 12 is a flowchart illustrating a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
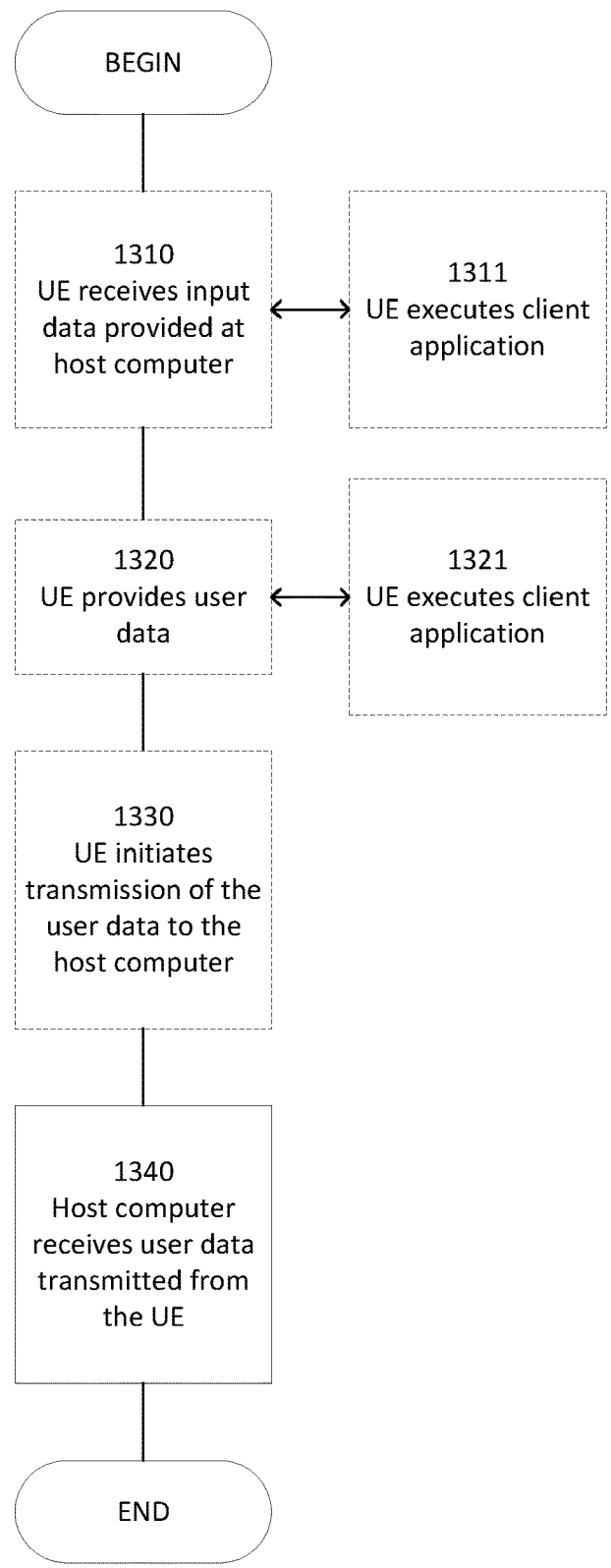
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
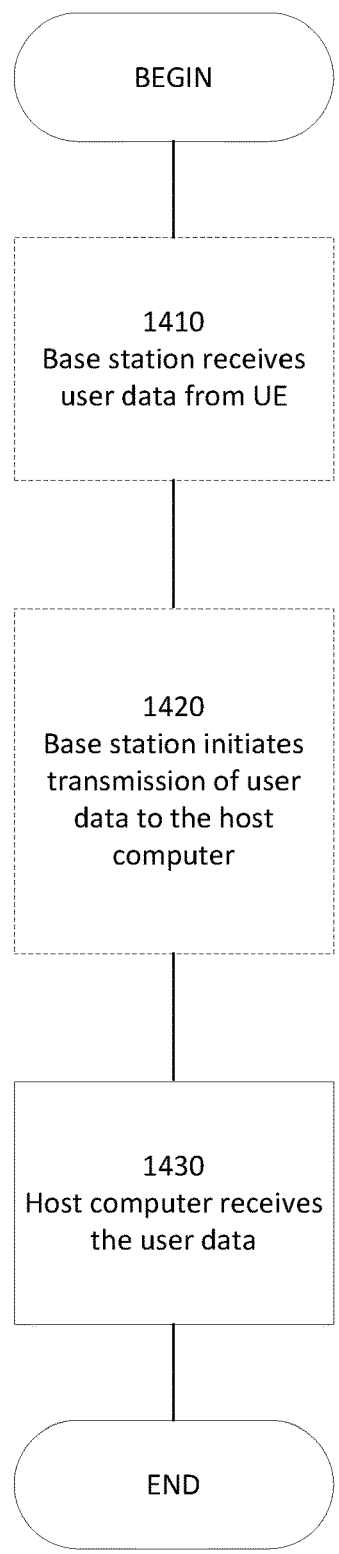
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A first node configured for transfer of application data between the first node and a second node via a wireless communication network, the first node comprising:
   communication circuitry; and
   processing circuitry configured to:
      receive from the second node application-layer control signaling that indicates an extent to which the second node will be available for a prospective transfer of application data to or from the second node, wherein the extent indicated by the application-layer control signaling includes an amount of application data that the second node will be available to transmit or receive in the prospective transfer;
      determine, from the application-layer control signaling, the amount of application data that the second node will be available to transmit or receive in the prospective transfer; and
      determine, based on the determined amount, whether and/or when to proceed with the prospective transfer of application data.

2. The first node of claim 1, wherein the processing circuitry is configured to determine whether or when to proceed with the prospective transfer based on comparing the extent to which the application-layer control signaling indicates the second node will be available and an extent to which the second node will need to be available in order for the prospective transfer to succeed.

3. The first node of claim 1, wherein the processing circuitry is further configured to, responsive to determining not to proceed with the prospective transfer:
- refrain from transmitting a request to the second node for the prospective transfer;
- transmit a response that rejects a request received from the first node for the prospective transfer; or
- cancel the prospective transfer.

4. The first node of claim 1, wherein the application-layer control signaling indicates when the second node will be available for the prospective transfer.

5. The first node of claim 1, wherein the processing circuitry is configured to determine whether to proceed with the prospective transfer based on comparing the determined amount of application data that the second node will be available to transmit or receive in the prospective transfer and an amount of application data that the second node will need to be available to transmit or receive in order for the prospective transfer to succeed.

6. The first node of claim 1, wherein the application-layer control signaling indicates an extent to which the second node will be available for the prospective transfer of application data related to one or more specific applications or services and/or over one or more specific types of connections.

7. The first node of claim 1, wherein the application-layer control signaling comprises one or more fields in a header of a hypertext transfer protocol, HTTP, message.

8. The first node of claim 1, wherein the processing circuitry is configured to determine, based on the determined amount and at an application layer of the first node, whether and/or when to proceed with the prospective transfer of application data.

9. A method for transfer of application data between a first node and a second node via a wireless communication network, the method performed by the first node and comprising:
- receiving from the second node application-layer control signaling that indicates an extent to which the second node will be available for a prospective transfer of application data to or from the second node, wherein the extent indicated by the application-layer control signaling includes an amount of application data that the second node will be available to transmit or receive in the prospective transfer;
- determining, from the application-layer control signaling, the amount of application data that the second node will be available to transmit or receive in the prospective transfer; and
- determining, based on the determined amount, whether and/or when to proceed with the prospective transfer of application data.

10. The method of claim 9, wherein said determining comprises determining whether or when to proceed with the prospective transfer based on comparing the extent to which the application-layer control signaling indicates the second node will be available and an extent to which the second node will need to be available in order for the prospective transfer to succeed.

11. The method of claim 9, wherein the application-layer control signaling indicates when the second node will be available for the prospective transfer.

12. The method of claim 9, wherein the application-layer control signaling comprises one or more fields in a header of a hypertext transfer protocol, HTTP, message.

* * * * *